United States Patent [19]

Yoshida

[11] Patent Number: 5,307,200
[45] Date of Patent: Apr. 26, 1994

[54] SEMICONDUCTOR OPTICAL DEVICE HAVING AN OPTICAL CONFINEMENT STRUCTURE

[75] Inventor: Tomoaki Yoshida, Natori, Japan

[73] Assignees: Ricoh Company, Ltd., Tokyo; Ricoh Research Institute of General Electronics Co., Ltd., Natori, both of Japan

[21] Appl. No.: 45,201

[22] Filed: Apr. 13, 1993

[30] Foreign Application Priority Data

Apr. 14, 1992 [JP] Japan .................... 4-094449

[51] Int. Cl.⁵ .................................... H01L 33/00
[52] U.S. Cl. .................................... 359/248
[58] Field of Search ............... 359/248, 245; 357/16, 357/30

[56] References Cited

U.S. PATENT DOCUMENTS

| | | | |
|---|---|---|---|
| 4,525,687 | 6/1985 | Chemla et al. | 359/345 |
| 5,117,477 | 5/1992 | Satoh | 357/30 X |
| 5,126,875 | 6/1992 | Tabuchi | 359/245 X |
| 5,200,605 | 4/1993 | Satoh et al. | 359/245 X |

Primary Examiner—Mark Hellner
Attorney, Agent, or Firm—Oblon, Spivak, McClelland, Maier & Neustadt

[57] ABSTRACT

A planar semiconductor optical device for modulating an optical beam includes an active layer provided on a substrate, the active layer having a quantum structure and being laterally surrounded by an optical confinement region which has a refractive index smaller than the effective refractive index of the active layer.

13 Claims, 8 Drawing Sheets

SEMICONDUCTOR OPTICAL DEVICE HAVING AN OPTICAL CONFINEMENT STRUCTURE

BACKGROUND OF THE INVENTION

The present invention generally relates to semiconductor devices and more particularly to a planar semiconductor optical device used for modulating an optical beam in response to an electric signal supplied thereto.

In the field of optical telecommunications and optical information processing, optical modulating elements for modulating an incident optical beam in response to an electric signal is needed. For example, in switching of optical signals between two or more optical paths, it is practiced to provide an optical coupler that couples two or more optical waveguides and to modulate the refractive index of the optical waveguides such that the optical signal is transferred from one optical waveguide to the other optical waveguide, or vice versa.

On the other hand, in order to handle the interconnection of large number of optical paths simultaneously, it is advantageous to provide optical modulation elements in row and column formation to form a two-dimensional array. There, each modulation element is connected to a corresponding optical waveguide, optical fiber or a lens, and each modulation element controls the passage of the optical signal therethrough.

In order to realize such an optical modulation element, intensive efforts are being made and various devices are proposed so far. Particularly, the so-called quantum optical devices that create quantum levels or exciton levels therein for interaction with the supplied optical beam are considered most promising and various studies have been made. In the quantum optical devices, the carriers such as electrons and holes that interact with the incident optical beam are confined at least in one of the three-dimensions with a size comparable to the de-Broglie wavelength of the carriers. As a result of the carrier confinement, there appears discrete quantum levels as is well known in the art. Further, such a structure for confining the carriers generally has a size comparable to or smaller than the Bohr radius of the electron-hole system and creates clear and discrete energy levels for excitons even in the room temperature environment. In the bulk crystals that lack the quantum confinement of carriers, the energy spectra of excitons can be observable only at the extremely low temperatures.

The quantum devices characterized by the exciton levels are susceptible to irradiation of incident optical beam in that the incident optical beam, when having a wavelength matching the energy level of the excitons in the device, cause an excitation of electrons and holes to form excitons, and the excitons thus formed cause a decomposition or ionization to form electrons and holes. In other words, the electrons and holes are released upon absorption of the incident optical beam. The electrons and holes thus released occupy respective quantum levels and the quantum levels are saturated with the electrons and holes with the progress of ionization of the excitons. Thereby, the absorption of the optical beam by the excitons no longer occurs. In other words, the device shows a strong non-linearity in the optical absorption and hence in the refractive index.

Figure 1:
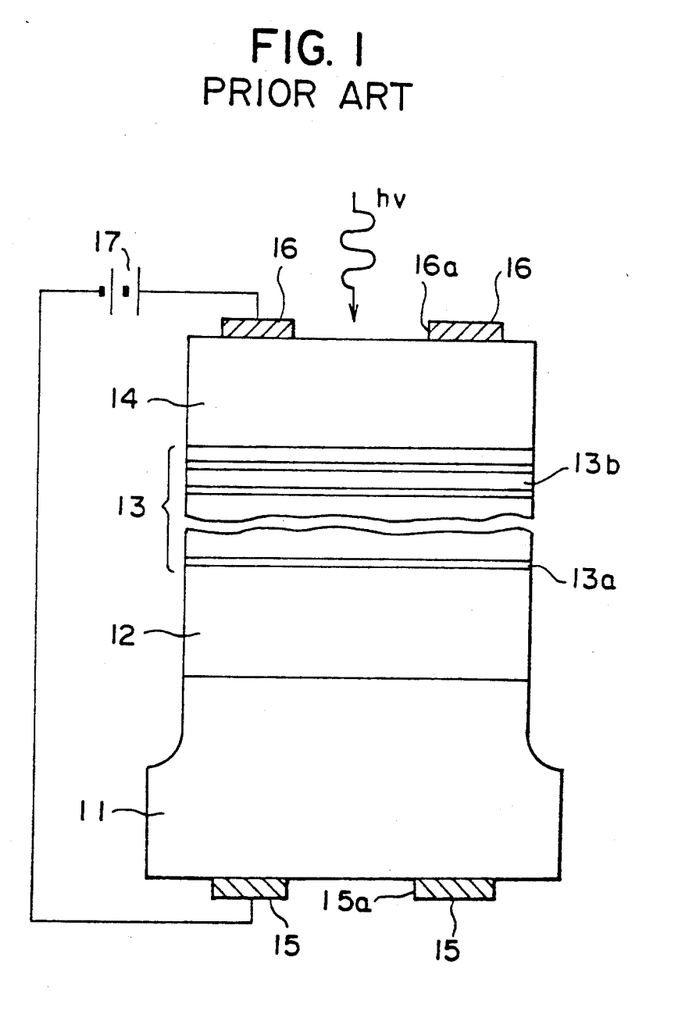
FIG. 1 is a diagram showing the structure of a conventional planar semiconductor optical modulating device.

FIG. 1 shows an example of the optical modulating element that is designed for use in the two-dimensional optical modulation array.

Referring to FIG. 1, the device is constructed on a p+-type GaAs substrate 11 covered by a buffer layer 12 of p-type GaAs with a thickness of about 3000 Å. On the buffer layer 12, an active layer 13 having a MQW structure is provided with a thickness of about 2500 Å, wherein the MQW layer 13 is formed by a repetitive deposition of a layer unit that consists of an undoped GaAs barrier layer 13a having a thickness of 150 Å and an undoped InGaAs quantum well layer 13b having a composition of $In_{0.13}Ga_{0.87}As$ and a thickness of 100 Å. The layer unit is repeated for ten times to form the MQW layer 13, wherein, in the layer 13, the InGaAS quantum well layer 13b characterized by a small bandgap $Eg_1$, is sandwiched by a pair of GaAs barrier layers 13a having a larger bandgap $Eg_2$. Thereby, discrete quantum levels are formed in the quantum well layer 13b with a mutual energy separation determined by the thickness of the quantum well layer 13b. It should be noted that the thickness of the active layer 13b is set such that the quantum levels formed therein correspond to the optical energy of the incident optical beam that is supplied to the device for optical modulation. On the MQW layer 13, a contact layer 14 of n+-type GaAs is deposited with a thickness of about 3000 Å. Further, a p-type ohmic electrode 15 of a Au/Zn alloy is provided on the lower major surface of the substrate 11, and an n-type ohmic electrode 16 of a Pd/Ge alloy is provided on the upper major surface of the contact layer 14.

There, the electrodes 15 and 16 are provided with respective windows 15a and 16a for the optical beam, wherein the window 15a exposes the lower major surface of the substrate 11 while the window 16a exposes the upper major surface of the contact layer 14. Thereby, the incident optical beam is supplied to the window 16a as indicated in FIG. 1 and exits from the device via the window 15a, after experiencing the optical modulation at the MQW layer 13.

In operation, a reverse bias voltage is applied across the electrodes 15 and 16 from a d.c. voltage source 17 such that a potential gradient or electric field is induced within the MQW layer 13. Thereby, the absorption wavelength of the MQW layer 13 shifts by a mechanism such as the Franz-Keldysh effect or quantum confinement Stark effect, and the absorption of the incident optical beam, initially tuned to the absorption wavelength of the MQW layer 13, changes. In other words, a modification of the optical beam is achieved in response to an electric signal supplied to the device.

By forming the device of FIG. 1 on a common substrate in a row and column formation, one can realize a desired two-dimensional array of the optical modulating device. In the device of FIG. 1, it will be noted that it is also possible to obtain the desired optical modulation by injecting carriers to the MQW layer 13 by applying a forward bias voltage across the electrodes 15 and 16 Thereby, the refractive index and hence the absorption of the MQW layer changes by the plasma effect.

In the device of FIG. 1, one may provide a Bragg reflector in correspondence to the layer 12 for reflecting back the incident optical beam. Typically, the Bragg reflector used for the layer 12 consists of an alternate stacking of first and second layers forming a unit of repetition, wherein the first and second layers have a total thickness, in each unit of repetition, equal to one-quarter the wavelength of the incident optical beam in each layer. In other words, the Bragg reflector layer is tuned to the incident optical beam and selectively reflects the optical beam having a wavelength to which the Bragg reflector is tuned. Thus, when the MQW layer 13 absorbs the incident optical beam, the reflection of the incident optical beam does not occur, while when the MQW layer 13 is biased, the incident optical beam reaches the Bragg reflector at the layer 12 and is reflected back.

In the construction of the device of FIG. 1, it will be noted that the MQW layer 13 is exposed laterally such that there is no optical confinement for those optical beams that have a component propagating laterally within the MQW layer 13. In other words, the structure of FIG. 1 lacks the construction for preventing the incident optical beam from spreading laterally. Associated with this problem, the conventional optical modulating devices have suffered from the problem of large optical loss, particularly to those optical beam components that have entered the device obliquely. Thus, the problem of optical loss is particularly serious in the optical modulation devices that use a Bragg reflector for reflecting the optical beam back and forth a number of times. It will be noted that the optical beam tends to spread laterally away from the region that is aligned with respect to the windows 15a and 16a, when the reflection is repeated a number of times. Thereby, the optical loss increases and the efficiency of modulation of the optical beam is inevitably deteriorated.

It should be noted that the structure of FIG. 1 has another drawback in that the active part of the device tends to be affected by the environmental condition such as moisture because of the side wall of the active layer exposed to the environment. Further, such a structure is mechanically fragile.

Although it is known in the art to cover the optically active parts by the deposition of silicon oxide film to achieve an optical confinement as well as protection, the thickness of such a silicon oxide layer generally cannot exceed more than 1000 Å particularly when deposited on a compound semiconductor material as shown in FIG. 1. In order to achieve an effective optical confinement, one needs a thickness of at least 1 μm, preferably 2-3 μm for the silicon oxide layer. When silicon oxide is deposited on the side wall of the optical semiconductor device as shown in FIG. 1 with such a large thickness, various problems such as cracking or detachment occurs in relation to the mismatching of various physical parameters such as thermal expansion coefficient. Associated therewith, various adverse effects such as build-up of strain occur also on the active part of the device and the optical property of the device is inevitably deteriorated.

SUMMARY OF THE INVENTION

Accordingly, it is a general object of the present invention to provide a novel and useful planar semiconductor optical device wherein the foregoing problems are eliminated.

Another and more specific object of the present invention is to provide a planar semiconductor optical device for modulating an optical beam supplied thereto in response to an electric signal, wherein leakage of the incident optical beam away from a predetermined optical path is minimized.

Another object of the present invention is to provide a planar semiconductor optical device for modulating an optical beam, comprising:

a substrate of a semiconductor material doped to a first conductivity type and having upper and lower major surfaces;

an active layer having an upper major surface and provided on said upper major surface of said substrate, said active layer having a quantum structure for confining carriers in at least one of three mutually perpendicular directions, such that discrete quantum levels appear in said quantum structure, said active layer being laterally defined by a side wall extending in a direction generally vertical to said upper major surface of said substrate;

a contact layer of a semiconductor material doped to a second, opposite conductivity type and having upper and lower major surfaces and provided on said upper major surface of said active layer;

an optical confinement region provided adjacent to said active layer in an intimate contact to said side wall, said optical confinement region having a refractive index smaller than an effective refractive index of said active layer for confining the optical beam in said active layer;

first electrode means provided on said upper major surface of said contact layer for biasing said active layer to induce a change in an optical property therein, said first electrode means being provided with a first passage for an optical beam such that said optical beam can pass through said first electrode means freely in a direction substantially perpendicular to said upper major surface of said contact layer; and second electrode means provided on said lower major surface of said substrate for biasing said active layer together with said first electrode means.

According to the present invention, the optical beam is effectively confined within the active layer and the lateral spreading of the optical beam away from the device through the side wall is effectively eliminated. Thereby, the loss of the optical beam does not occur even when the optical beam is reflected back and forth in the device a plurality of times, and the efficiency of modulation of the optical beam is improved substantially.

Other objects and further features of the present invention will become apparent from the following detailed description when read in conjunction with the attached drawings.

DETAILED DESCRIPTION OF PREFERRED EMBODIMENTS

Figure 2A:
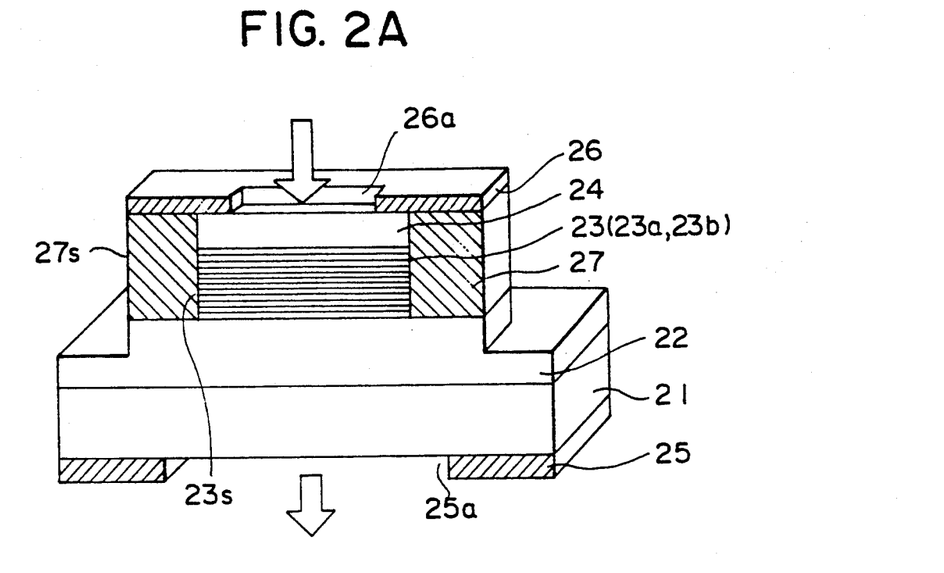
FIG. 2A is a diagram showing the structure of a planar semiconductor optical modulating device according to a first embodiment of the present invention.

FIG. 2A shows a semiconductor optical device according to a first embodiment of the present invention.

Figure 2B:
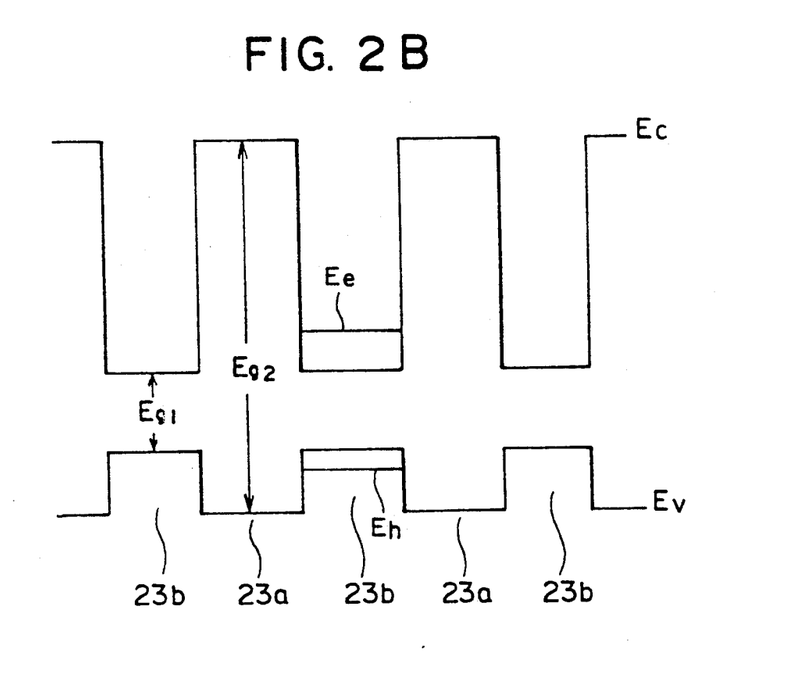
FIG. 2B is a band diagram showing the band structure of the essential part of the device of FIG. 2A.

Referring to FIG. 2A, the device has a structure similar to FIG. 1 and is constructed on a $p^+$-type GaAs substrate 21 covered by a buffer layer 22 of $p^+$-type GaAs with a thickness of about 3000 Å. On the buffer layer 22, an active layer 23 having a MQW structure is provided with a thickness of about 6000 Å, wherein the MQW layer 23 is formed by a repetitive deposition of a layer unit that consists of an undoped GaAs barrier layer 23a having a thickness of about 100 Å and an undoped InGaAs quantum well layer 23b having a composition of $In_{0.15}Ga_{0.85}As$ and a thickness of about 100 Å. The layer unit is repeated for thirty times to form the MQW layer 23, wherein, in the layer 23, the InGaAS quantum well layer 23b, which is characterize by a small bandgap $Eg_1$, is sandwiched by a pair of GaAs barrier layers 23a having a larger bandgap $Eg_2$ as shown in the band diagram of FIG. 2B. In FIG. 2B, Ec represents the conduction band while Ev represents the valence band. Thereby, discrete quantum levels for electrons and holes are formed in the quantum well layer 23b with a mutual energy separation determined by the thickness of the quantum well layer 23b as shown in FIG. 2B by Ee and Eh, wherein Ee represents the quantum level of electrons while Eh represents the quantum level of the holes. It should be noted that the thickness of the quantum well layer 23b is set such that the quantum levels formed therein correspond to the optical energy of the incident optical beam that is supplied to the device for optical modulation. On the MQW layer 23, a contact layer 24 of $n^+$-type GaAS is deposited with a thickness of about 3000 Å. Further, a p-type ohmic electrode 25 of the Au/Zn alloy structure is provided on the lower major surface of the substrate 21, and an n-type ohmic electrode 26 of the Pd/Ge alloy structure is provided on the upper major surface of the contact layer 24.

There, the electrodes 25 and 26 are provided with respective windows 25a and 26a for the optical beam, wherein the window 25a exposes the lower major surface of the substrate 11 while the window 26a exposes the upper major surface of the contact layer 24. Typically, the windows 25a and 26a have a size in the order of 10 μm. Thereby, the incident optical beam is supplied to the window 26a as indicated in FIG. 2A and exits from the device via the window 25a, after experiencing the optical modulation at the MQW layer 23 in a direction substantially perpendicularly to the principal surface of the substrate 21.

Similar to the conventional device of FIG. 1, the MQW layer 23 interacts with the incident optical beam supplied to the window 26a with a wavelength included in the range of 0.92–1.06 μm, wherein a modification in the optical absorption spectra occurs in the MQW layer 23 in response to the application of a reverse bias voltage across the electrodes 25 and 26. More specifically, a shift of the optical absorption spectra in the magnitude of about 6000 $cm^{-1}$ or more is observed in response to application of voltage on the order of 5 volts across the electrodes 25 and 26.

It should be noted that the system of GaAs/InGaAs MQW used for the layer 23 forms a strained superlattice structure due t the large difference in the atomic radius between Ga and In, wherein there is an upper limit in the thickness of the InGaAs quantum well layer 23b that can establish a lattice matching the GaAs barrier layer 23a and hence the GaAs substrate 21. Typically, the thickness of the quantum well layer 23b has to be set smaller than about 100–900 Å, depending of course on the composition and the condition of crystal growth, wherein the foregoing thickness of 100 Å for the layer 23b falls in this range. In view of the Bohr radius of excitons in InGaAs of about 120 Å, the quantum well layer 23b having the thickness of about 100 Å shows discrete quantum levels for the excitons. On the other hand, when the thickness of the InGaAs layer 23b has decreased below about 50 Å, the effective carrier confinement is no longer obtained in view of the difference in the band gap $Eg_2$ for the barrier layer 23a and the band gap $Eg_1$ for the quantum well layer 23b. Generally, the conduction band of the barrier layer 23a should be formed at a level higher than the conduction band of the quantum well layer by at least 8 meV, while the valence band of the barrier layer 23a should be formed at a level higher than the valence band of the quantum well layer 23b by at least 4 meV. In order to achieve a satisfactory carrier confinement and hence a satisfactory optical modulation, it is preferred that the conduction band of the barrier layer 23a is located higher than that of the quantum well layer 23b by at least 50 meV.

In the structure of FIG. 2, it should be noted that the MQW layer 23 as well as the contact layer 24 thereon form a MQW mesa structure defined by a side wall 23s, and the side wall 23s is surrounded by an optical confinement region 27 of undoped AlGaAs that establishes an intimate contact to said side wall 23s. In the present embodiment, the AlGaAs optical confinement region 27 has a composition of $Al_{0.3}Ga_{0.7}As$ and is characterized by a refractive index that is substantially smaller than the effective refractive index of the MQW layer 23. It should be noted that the MQW layer 23 having the composition described before has an effective refractive index of about 3.60 while the AlGaAs region 27 has a refractive index of 3.49. Because of the MQW layer 23 being surrounded laterally by the region 27 of low refractive index, the optical beam injected to the MQW layer 23 is channeled or guided by the region 27 and the escape of the incident optical beam from the MQW layer 23 across the side wall 23s is effectively eliminated.

In the structure of FIG. 2A, it should be noted that the electrode 26 covers the upper major surface of the region 27 as well as the upper major surface of the layer 24 continuously, and the window 26a has a size comparable to the lateral size of the MQW mesa structure. Thereby, substantially the entirety of the optical beam that has entered the device through the window 26a is confined in the mesa structure and radiated from the lower window 25a after optical modulation, even when the effect of diffraction at the edge of the window 26a is taken into consideration. As a result, the optical loss can be reduced significantly. Conversely saying, in the structure of FIG. 2A, one can reduce the lateral size of the MQW mesa of FIG. 2A to the size comparable to the size of the window 26a, without complicating the fabrication process of the device. Hereinafter, the fabrication process of the device of FIG. 2 will be described briefly.

After depositing the GaAs buffer layer 22 on the GaAs substrate 21 as usual, the MQW layer 23 is formed by depositing the GaAs barrier layer 23a and the InGaAs quantum well layer 23b alternately and repeatedly on the upper major surface of the buffer layer 22. Further, the contact layer 24 is deposited on the MQW layer 23. The foregoing processes of depositing the layers 22–24 are typically conducted by the MBE process.

After a semiconductor layered body containing the MQW layer 23 and the contact layer 24 are formed, the semiconductor layered body is subjected to an anisotropic etching process such as RIE to form the MQW mesa defined by the side wall 23s. The RIE process is continued until the upper major surface of the buffer layer 22 is exposed, and the AlGaAs region 27 is formed by depositing AlGaAs on the exposed upper major surface of the layer 22 by a MOCVD process, while protecting the upper major surface of the layer 24 by a mask. Thereby, the gap region formed between the mesa structures as a result of the mesa etching is filled substantially by the AlGaAs region 27. After the region 27 is thus formed, the electrode 26 is deposited on the semiconductor body thus formed and patterned subsequently. Thereby, the electrode 26 is formed to cover the upper major surface of the region 27 and the upper major surface of the layer 24 continuously. Further, the window 26a is formed as a result of the patterning. It should be noted that there is no difficulty in providing the electrode 26 in the device of FIG. 2A thus formed. Finally, an isolation trench is formed by applying a mesa etching to the AlGaAs region 27 to reach the buffer layer 22. Thereby, a mesa structure defined by a side wall 27s is formed as shown in FIG. 2.

As already noted, the escape of the optical beam from the MQW layer 23 across the mesa wall 23s is eliminated in the device of FIG. 2, and the optical beam is effectively confined in the MQW layer 23. Thereby, the optical loss is reduced by almost one-half in the device of the present embodiment that uses the window 26a of 10 $\mu$m size. Associated with the improvement in the optical loss, the efficiency of modulation is improved by more than 10%. As a result, one can achieve an optical modulation that reaches a value as much as 25%.

Next, a second embodiment of the present invention will be described with reference to FIG. 3, wherein those parts corresponding to the parts shown in FIG. 2 are designated by the same reference numeral and the description thereof will be omitted.

Figure 3:
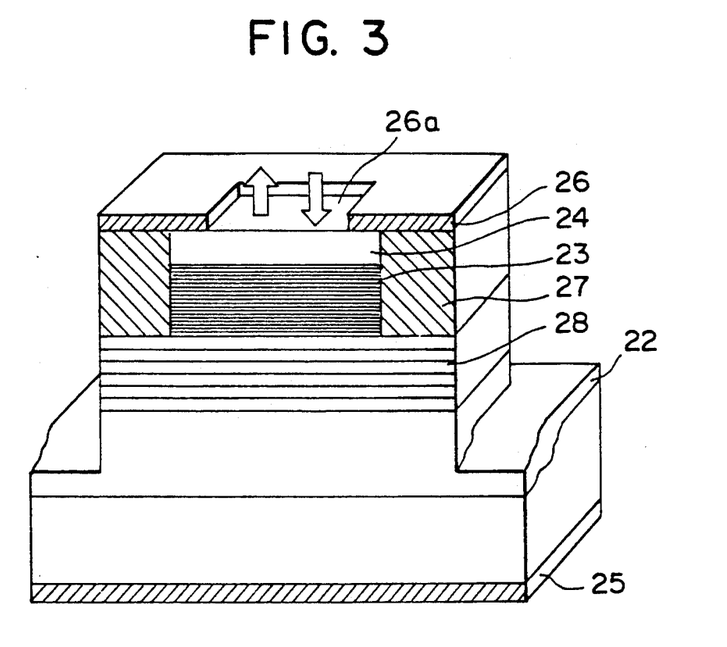
FIG. 3 is a diagram showing the structure of a planar semiconductor optical modulating device according to a second embodiment of the present invention.

Referring to FIG. 3, the device of the present embodiment includes a reflection layer 28 interposed between the buffer layer 22 and the MQW layer 23, wherein the reflection layer 28 includes an alternate repetition of an p-type GaAs layer 28a and an p-type AlAs layer 28b repeated twenty times. There, the layers 28a and 28b have respective thicknesses set such that the total thickness of one single layer of the layer 28a and one single layer of the layer 28b is equal to one-quarter the wavelength of the incident optical beam. For example, the layer 28a may have a thickness of 670 Å while the layer 28b may have a thickness of 770 Å in correspondence to the optical beam of which wavelength is 9800 Å.

In such a structure, a periodically changing refractive index profile is formed in the reflection layer 28 with a period equal to one-quarter the wavelength of the incident optical beam. Thereby, the well known condition of Bragg reflection holds, and the incident optical beam is reflected back to the window 26a. Associated with the foregoing construction, the window 25a provided in the lower electrode 25 in the embodiment of FIG. 2, is eliminated in the present embodiment. In other words, the electrode 25 has no window for passing the optical beam therethrough.

In the present embodiment, the device provides an advantageous feature in that the optical loss decreases substantially even when size of the window 26a is decreased. For example, in the device wherein the size of the window 26a is set to 5 $\mu$m and the size of the MQW mesa is set to 15 $\mu$m in correspondence thereto, it has been observed that the optical loss becomes smaller than that of the conventional device of FIG. 1 by a factor of three. Thereby, one can achieve the degree of optical modulation that reaches a level of as much as 35%.

Next, a third embodiment of the present invention will be described with reference to FIG. 4, wherein those parts described previously with preceding drawings are designated by the same reference numerals and the description thereof will be omitted.

In the present embodiment, the device has a structure substantially identical to the device of FIG. 3 except that a second reflection layer 29 is provided to intervene between the MQW layer 23 and the contact layer 24. The second reflection layer 29 has a construction substantially identical with the first reflection layer 28 except for the conductivity type and causes a Bragg reflection of the incident optical beam. Thereby, the reflection layer 28 and the reflection layer 29 form an optical resonator. With the use of the optical resonator thus formed, the optical energy is concentrated in a resonant mode, and the efficiency of optical modulation is improved further. More specifically, the degree of optical modulation is improved by about 15% in the present embodiment as compared with the conventional device, and the device can provide an optical modulation that reaches 40% or more. Thereby, an optical modulation with a contrast ratio exceeding 50 is achieved.

Next, a fourth embodiment of the present invention will be described with reference to FIG. 5.

Figure 4:
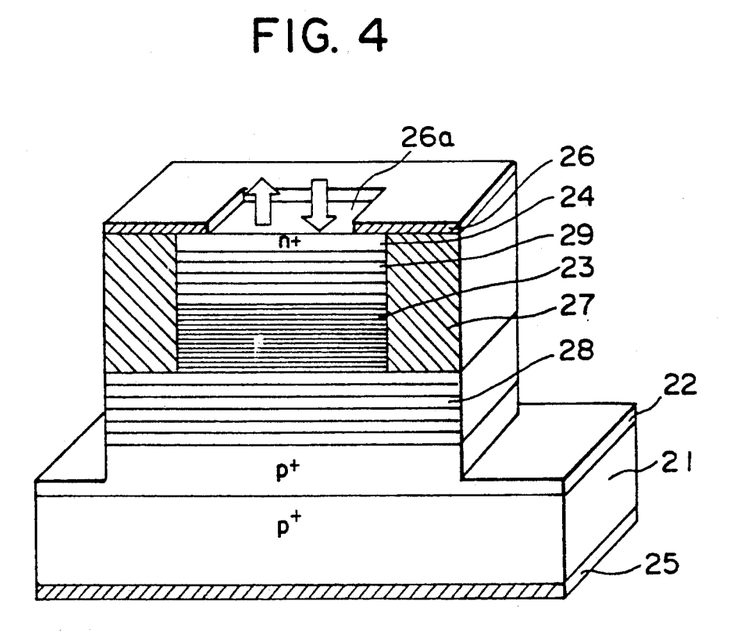
FIG. 4 is a diagram showing the structure of a planar semiconductor optical modulating device according to a third embodiment of the present invention.
Figure 5:
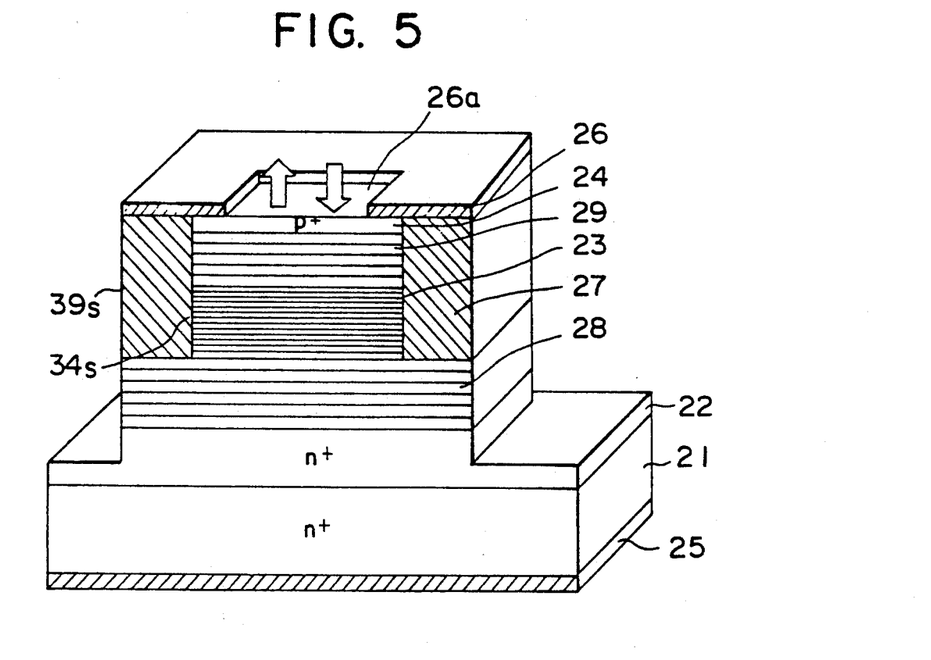
FIG. 5 is a diagram showing the structure of a planar semiconductor optical modulating device according to a fourth embodiment of the present invention.

Referring to FIG. 5, the device of the present embodiment has a structure substantially identical to the device of FIG. 4 except that the conductivity type is reversed. Thus, the GaAs substrate 21, the buffer layer 22 and the first reflection layer 28 are doped to the $n^+$-type, while the second reflection layer 29, the contact layer 24 is doped to the p-type. Associated therewith, the composition of the upper electrode 26 and the composition of the lower electrode 25 are interchanged. As other aspects of the present embodiment is identical with the device of FIG. 6, further description will be omitted.

In any of the foregoing embodiments, it is possible to achieve a substantially complete optical confinement, by setting the refractive index of the optical confinement region 27 appropriately with respect to the refractive index of the MQW layer 23 and the refractive index of the environment. Hereinafter, the principle of the foregoing feature that forms an essential part of the present invention will be described in more detail with reference to FIG. 6 showing the geometrical optics for the refraction of incident optical beam inside the device.

Figure 6:
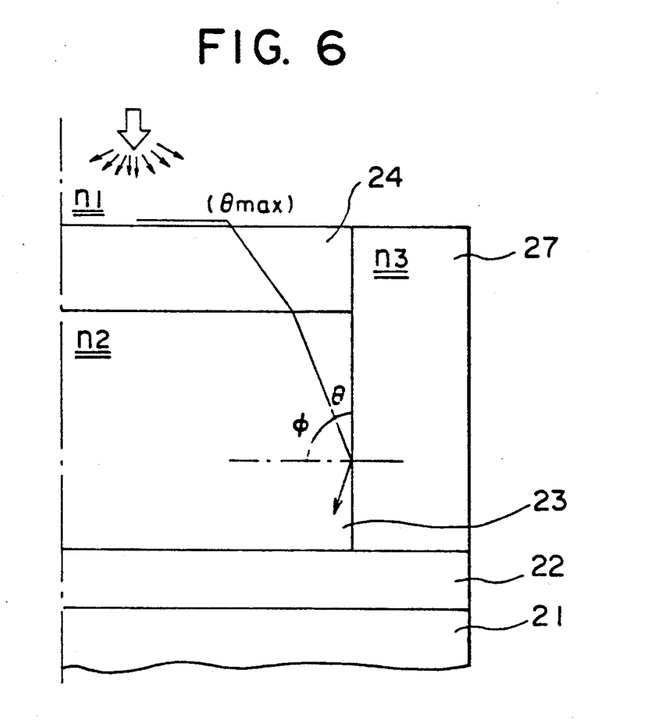
FIG. 6 is a cross-sectional diagram showing the principle of optical confinement in the device of the present invention.

Assuming that the optical modulating device of the present invention is operated in the air of which a refractive index is designated as $n_1$ such that the optical beam enters directly from the air to the layer 24 as indicated in FIG. 6, the maximum angle $\theta$ of the optical beam propagating in the MQW layer 23 is given as $$\theta = \sin^{-1}(n_1/n_2) \quad (1)$$

wherein $n_2$ represents the refractive index of the MQW layer 23 and the angle $\theta$ is defined in FIG. 6. It should be noted that Eq. (1) corresponds to the case wherein the incident optical beam enters directly into the device from the medium having the refractive index $n_1$ with a maximum incident angle $\theta_{max}$ of 180° as illustrated in FIG. 6. In other words, the medium (air in the present case) is located to provide the path of the incident optical beam. It should be noted that the incident angle of the optical beam is measured with respect to the upper major surface of the contact layer 24. In other words, the optical beam that enters the device with the maximum angle $\theta_{max}$ travels in the direction parallel to the upper major surface of the layer 24 along the surface of the layer 24. There, the refractive index $n_3$ of the optical confinement region 27 is set such that the total reflection of the optical beam occurs even when the condition (1) is met. Using the angle $\phi$ ($\phi = 90° - \theta$), the condition of total reflection is represented as $$n_3 \leq n_2 \sin\phi, \quad (2)$$

which can be rewritten as $$n_3 \leq n_2 \sqrt{1-(n_1/n_2)^2} \quad (3)$$

where the condition of Eq. (1) is incorporated in Eq. (3). In other words, Eq. (3) represents the condition of FIG. 6 corresponding to the total reflection occurring for any incident angle of the incident optical beam as shown in FIG. 6. In the present embodiment, the refractive index $n_1$ is 1 while the refractive index $n_2$ is 3.60. Further the refractive index $n_3$ is 3.49. Thereby, it will be noted that the foregoing Eq. (3) is satisfied in the present embodiment.

Figure 7:
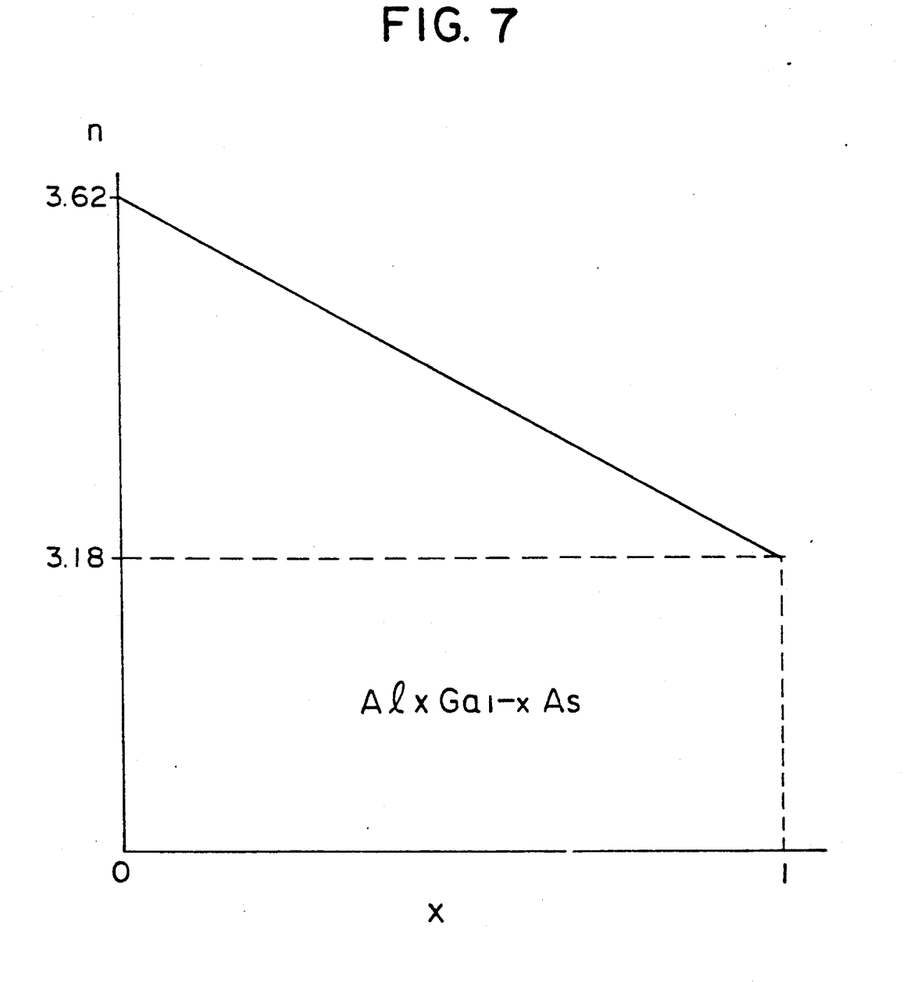
FIG. 7 is a diagram showing the relationship between the refractive index and composition for the AlGaAs semiconductor material.

Generally, the value of 3.45 or less for the refractive index $n_3$ satisfies the foregoing relationship of Eq. (3). FIG. 7 shows the relationship between the refractive index and composition of $Al_xGa_{1-x}As$. As will be noted therein, the refractive index of AlGaAs decreases with increasing content x of Al, and the foregoing relationship can be satisfied when the Al content x is set higher than 0.38. In other words, one can eliminate the problem of lateral spreading of the optical beam out from the MQW layer 23 by providing the AlGaAs region 27 with a composition such that the Al content is higher than about 0.38. For example, one can satisfy the foregoing condition of Eq. (3) by setting the composition of the optical confinement region 27 as $Al_{0.40}Ga_{0.60}As$. Thereby, the degree of optical modulation is improved by more than 20% as compared with the conventional device of FIG. 1, and one can obtain the degree of optical modulation of as much as 50%. Thereby, a contrast ratio exceeding 50 is attained.

Figure 8:
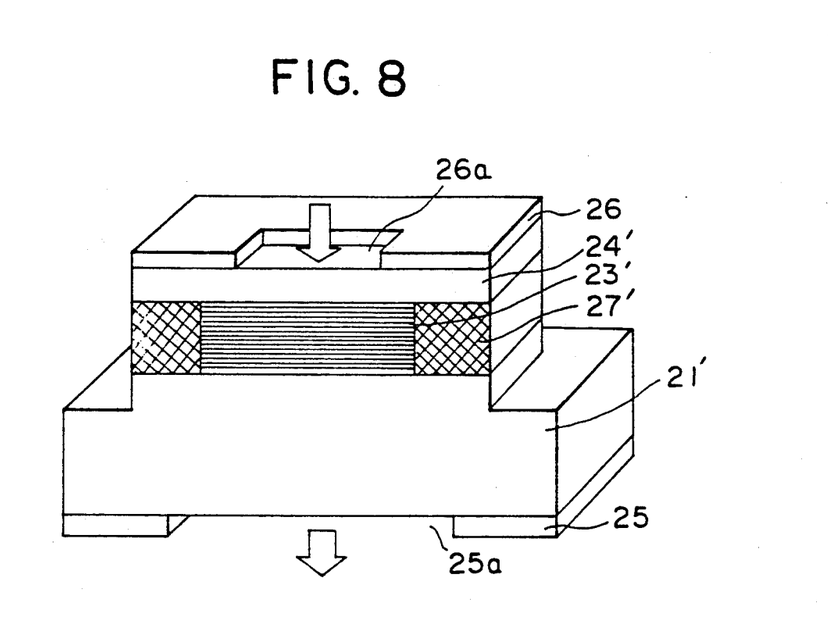
FIG. 8 is a diagram showing the structure of a planar semiconductor optical modulating device according to a fifth embodiment of the present invention.

FIG. 8 is a diagram showing a fifth embodiment of the present invention, wherein those parts corresponding to the parts described already with reference to FIG. 2A are described by the same reference numerals.

Referring to FIG. 8, the device has a structure substantially identical to the device of FIG. 2A, wherein a substrate 21' of n-type AlGaAs is used in place of the GaAs substrate 21. There, the substrate 21' has a composition of $Al_{0.2}Ga_{0.8}As$, and a MQW layer provided thereon. In the present embodiment, the MQW layer 23' is formed of an alternate repetition of an undoped GaAs layer acting as the quantum well layer and an undoped AlGaAs layer acting as the barrier layer, where the barrier layer has a composition of $Al_{0.3}Ga_{0.7}As$. Thereby, a band structure similar to the one shown in FIG. 2B is formed also in the MQW layer 23'. After the MQW layer 23' is formed, the contact layer 24' of the p-type GaAs or AlAl having the composition of $Al_{0.3}Ga_{0.7}As$ is deposited.

The layered semiconductor body thus obtained is the subjected to an annealing process conducted at a temperature of 850°–875° C. for 10 hours while covering the upper major surface of the layer 23' in correspondence to a marginal part thereof by an $SiO_2$ mask. The $SiO_2$ mask may be deposited by a plasma CVD process with a thickness of about 1500 Å. There, the $SiO_2$ mask absorbs Ga atoms from the surface of the layer 24' and created defects in place thereof. The defects thus creased cause a diffusion toward the interior of the layered body to cause the mixing of Ga and Al atoms in the MQW structure. Alternatively, one may use a laser beam annealing process such that a mutual diffusion of Ga and Al occurs selectively at the marginal region of the MQW layer 23'. Further, ion implantation process may be employed to incorporate accelerated ions into the MQW layer 23' in correspondence to where the region 27' is to be formed. Thereby, the artificial superlattice structure that characterizes the MQW layer 23' disappears in correspondence to a marginal region thereof and an optical confinement region 27' characterized by a reduced refractive index is formed to surround the layer 23' laterally. After the annealing process, the electrodes 25 and 26 are provided similarly to the embodiment of FIG. 2A, except that the electrode 25 is formed of the Pd/Ge alloy and the electrode 26 is formed of the Au/Zn alloy. Thereby, the electrode 26 is patterned to form a window 26a of which size is comparable to the lateral size of the MQW layer 23' thus surrounded by the optical confinement region 27'.

In the device of the present invention, one can achieve a change of optical absorption ($\Delta\alpha$) in the order of 20000 cm$^{-1}$ in response to an application of voltage of about 10 volts across the electrodes 25 and 26. Thereby, an improvement in the modulation efficiency of more than 10% can be achieved. It should be noted that the optical confinement region 27' formed as a result of interdiffusion of Ga and Al in the MQW layer 23 has a refractive index of about 3.56 that is substantially smaller than the refractive index of 3.60 of the MQW layer 23'. Thereby, an optical modulation of up to about 30% is attained.

Figure 9:
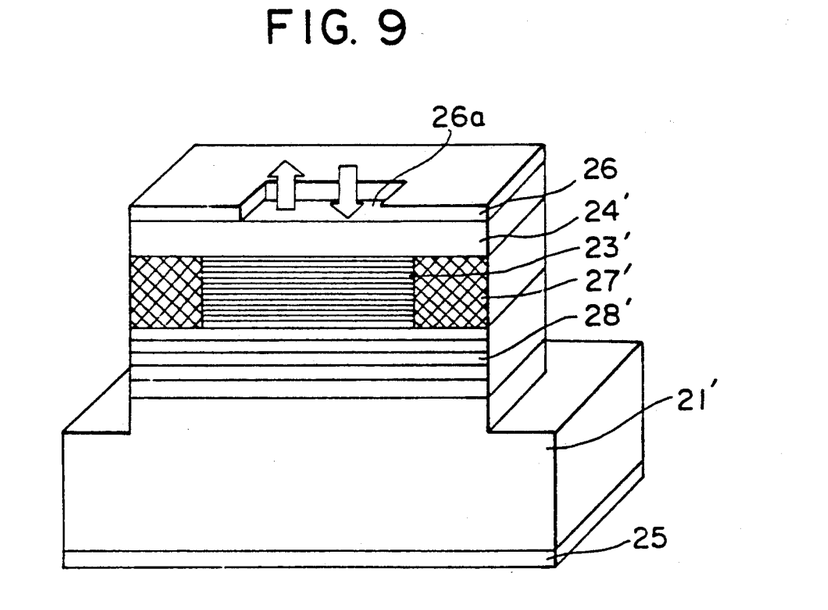
FIG. 9 is a diagram showing the structure of a planar semiconductor optical modulating device according to a sixth embodiment of the present invention.

Next, a sixth embodiment of the present invention will be described with reference to FIG. 9, wherein the device of FIG. 9 has a structure similar to the device of FIG. 8 except that a reflection layer 27' is provided between the substrate 21' and the MQW layer 23'. There, the reflection layer 27' includes an alternate repetition of AlAs and GaAs and may have a structure identical to the reflection layer 27. In the illustrated example, the stack of AlAs layer and GaAs layer is repeated for twenty times. Further, any structure wherein the refractive index changes alternately with a pitch corresponding to one-quarter the wavelength of the incident optical beam may be employed for the reflection layer 27. Such a structure includes the structure of GaAs/AlGaAs or AlGaAs/AlGaAs, in addition to the foregoing GaAs/AlAs structure.

In the device of the present embodiment, one can achieve the optical modulation of up to 40%. This corresponds to an improvement by more than 10%.

Figure 10:
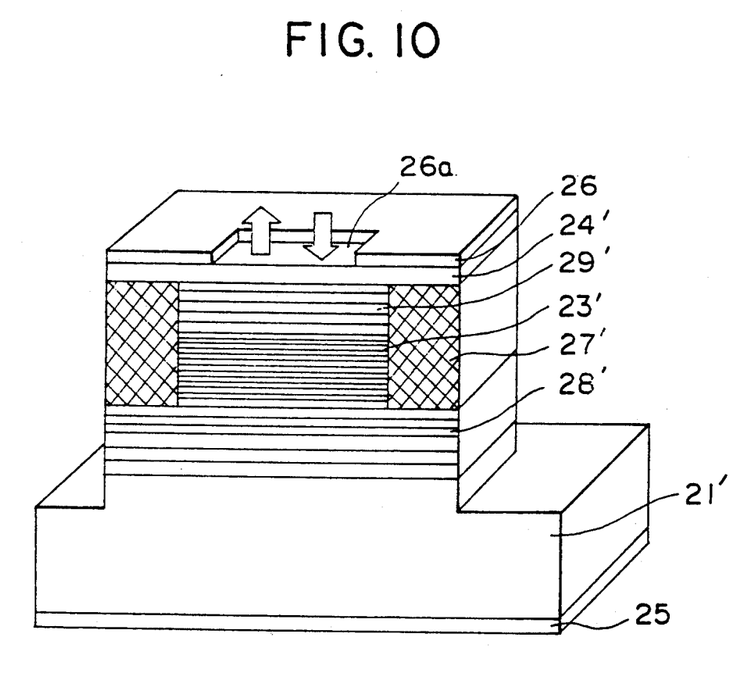
FIG. 10 is a diagram showing the structure of a planar semiconductor optical modulating device according to a seventh embodiment of the present invention.

Next, a seventh embodiment of the present invention will be described with reference to FIG. 10, wherein FIG. 10 is a modification of the device of FIG. 9.

Referring to FIG. 10, the device has a structure similar to the device of FIG. 4, wherein a second reflection layer 29' is provided on the MQW layer 23'. The second reflection layer 29' has the structure substantially identical with the first reflection layer 27', and the optical confinement region 27' is formed after the entire structure is formed, for example by the annealing process at 950°–875° C. by using a SiO$_2$ mask, to surround the MQW layer 23'. On the MQW layer 23' thus formed as well as on the optical confinement region 27' surrounding the MQW layer 23', the contact layer 24' is provided similarly to the previous embodiments. Further, the electrodes 25 and 26 are provided similarly to the previous embodiments. Again, the electrode layer 26 is provided with a window 26a that has a size corresponding to the lateral size of the MQW layer 23'. In the present embodiment, the efficiency of optical modulation is improved by more than 15%, and an optical modulation of as large as 50% is obtainable.

Figure 11:
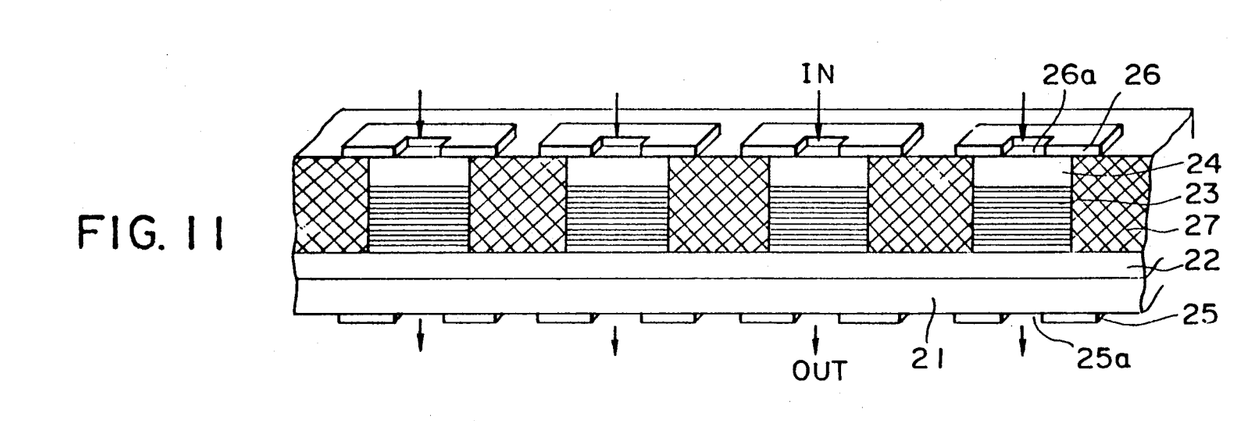
FIG. 11 is a diagram showing the structure of a planar semiconductor optical modulating device according to an eighth embodiment of the present invention.

Next, an eighth embodiment of the present invention will be described with reference to FIG. 11 wherein the optical modulating device of the previous embodiments are arranged in rows and columns to form a two-dimensional array. In the illustrated example, the transmission type device of FIG. 2A is used, wherein incident optical beams are supplied to the individual devices by corresponding optical fibers (not shown). It should be noted, however, that any device of the foregoing embodiments can be used to form the desired two-dimensional array of optical modulating devices. In the structure of FIG. 11, the gap between the adjacent devices is filled by the high resistivity optical confinement region 27.

Figure 12:
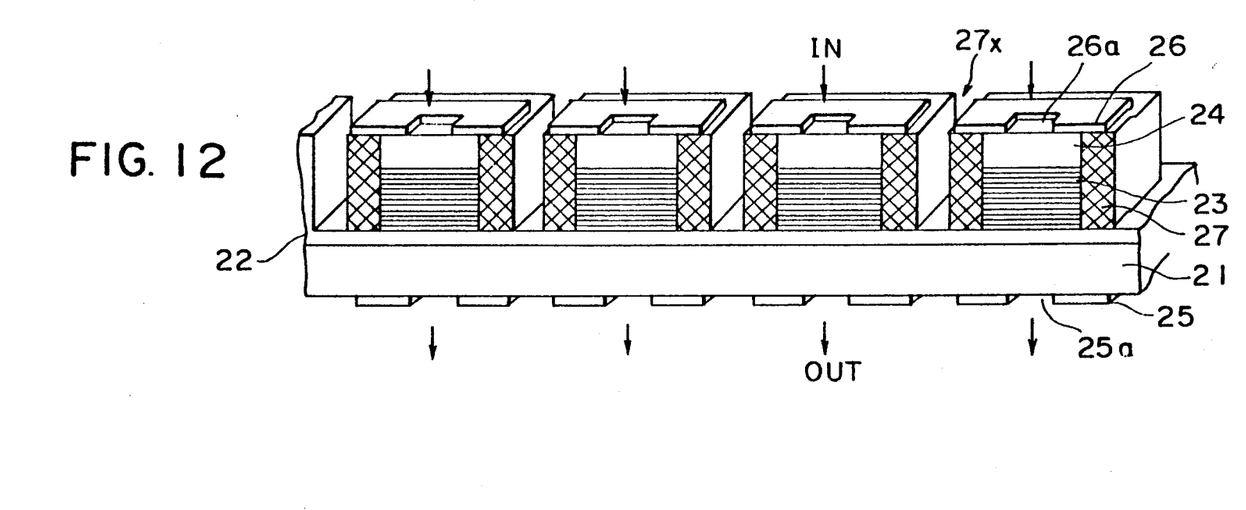
FIG. 12 is a diagram showing the structure of a planar semiconductor optical modulating device according to a ninth embodiment of the present invention.

FIG. 12 shows a ninth embodiment of the present invention, wherein an isolation trench 27x is formed in the optical confinement region 27 to expose the upper major surface of the buffer layer 22.

In any of the planar semiconductor optical modulating devices of the present invention, it should be noted that one can control the optical property, particularly the refractive index and optical absorption, by supplying a control optical beam via the window provided in the electrode 25 or 26, similarly to the case of applying a control voltage. There, the wavelength of the control optical beam is set such that an interaction occurs between the control optical beam and the excitons formed in the quantum well layer in the MQW, wherein it will be noted that such an interaction causes an ionization of the excitons. Thereby, the effects such as screening or phase space filling occurs that in turn induces the change in the optical property of the device.

Further, the optical confinement structure of the present invention is effective to other devices having different quantum structure such as quantum well wire or quantum well box for the MQW layer.

The planar semiconductor optical modulating device of the present invention can use various compound semiconductor materials including the III-V compound semiconductor materials and mixed crystals thereof such as GaAs, AlGaAs, AlGaInP, InP, InGaAsP, InGaP, InAlP, GaAsP, GaN, InAs, InAsP, InAsSb, and the like, the II-VI compound semiconductor materials and mixed crystals thereof such as ZnSe, ZnS, ZnSSe, CdS, CdSe, CdSSe, CdTe, HgCdTe, for the MQW layer as well as for the optical confinement region. In addition, other various semiconductor materials can be used such as PbSe, PbTe, PbSeTe, PbSnTe, Si, Ge, and SiGe.

Further, the present invention is not limited to the embodiments described heretofore, but various variations and modifications may be made without departing from the scope of the invention.

What is claimed is:

1. A planar semiconductor optical device for modulating an optical beam, comprising:

a substrate of a semiconductor material doped to a first conductivity type and having upper and lower major surfaces;

an active layer having an upper major surface and provided on said upper major surface of said substrate, said active layer having a quantum structure for confining carriers in at least one of three mutually perpendicular directions, such that discrete quantum levels appear in said quantum structure, said active layer being laterally defined by a side wall extending in a direction generally vertical to said upper major surface of said substrate;

a contact layer of a semiconductor material doped to a second, opposite conductivity type and having upper and lower major surfaces and provided on said upper major surface of said active layer;

an optical confinement region provided adjacent to said active layer in intimate contact with said side wall, said optical confinement region having a refractive index smaller than an effective refractive index of said active layer for confining the optical beam in said active layer;

first electrode means provided on said upper major surface of said contact layer for biasing said active layer to induce a change in an optical property therein, said first electrode means being provided with a first passage for an optical beam such that said optical beam can pass through first electrode means freely in a direction substantially perpendicular to said upper major surface of said contact layer; and second electrode means provided on said lower major surface of said substrate for biasing said active layer together with said first electrode means.

2. A planar semiconductor optical device as claimed in claim 1, wherein said optical confinement region has a refractive index determined with respect to an effective refractive index of said active layer and further with respect to a refractive index of a medium that is provided adjacent to said semiconductor optical device through which said incident optical beam passes to the semiconductor optical device, such that the optical beam is confined within said active layer, irrespective of an incident angle of said optical beam that is measured with respect to a plane parallel to said upper major surface of said substrate.

3. A planar semiconductor optical device as claimed in claim 2, wherein the refractive index of said optical confinement region is set to satisfy the following relationship:

$$n_3 \leq n_2 \sqrt{\{1-(n_1/n_2)^2\}}$$

where $n_1$ represents the refractive index of said medium, $n_2$ represents the effective refractive index of said active layer, and $n_3$ represents the refractive index of said optical confinement region.

4. A planar semiconductor optical device as claimed in claim 1, wherein said active layer comprises an alternate repetition of a first layer of an undoped semiconductor material having a first bandgap and a second layer of an undoped semiconductor material having a second, larger bandgap, wherein each of said first layers and second layers have upper and lower major surfaces and are stacked alternately on said upper major surface of said substrate.

5. A planar semiconductor optical device as claimed in claim 1, wherein said substrate includes a buffer layer having an upper major surface and a lower major surface such that said upper major surface of said buffer layer is coincident to said upper major surface of said substrate.

6. A planar semiconductor optical device as claimed in claim 1, wherein said first electrode means covers said upper major surface of said contact layer and said upper major surface of said optical confinement region continuously.

7. A planar semiconductor optical device as claimed in claim 6 wherein said upper major surface of said optical confinement region and said upper major surface of said contact layer form a flush surface.

8. A planar semiconductor optical device as claimed in claim 1, wherein said active layer and said optical confinement region are formed of respective compound semiconductor materials having different compositions.

9. A planar semiconductor optical device as claimed in claim 1, wherein said active layer and said optical confinement layer respectively comprise a compound semiconductor material selected from a group essentially consisting of: GaAs, AlGaAs, AlGaInP, InP, InGaAsP, InGaP, InAlP, GaAsP, GaN, InAs, InAsP, InAsSb, ZnSe, ZnS. ZnSSe, CdS, CdSe, CdSSe, CdTe, HgCTe, PbSe, PbTe, PbSeTE, and PbSnTe.

10. A planar semiconductor optical device as claimed in claim 1, wherein said active layer comprises an alternate repetition of a GaAs layer and an InGaAs layer, while said optical confinement region is comprised of AlGaAs.

11. A planar semiconductor optical device as claimed in claim 3, wherein said active layer comprises an alternate repetition of a GaAs layer and an InGaAs layer, while said optical confinement region comprises AlGaAs having a composition represented as $Al_xGa_{1-x}As$ with the compositional parameter set to be equal to or larger than 0.38 ($x \leq 0.38$).

12. A planar semiconductor optical device as claimed in claim 1, wherein said active layer has an average composition substantially the same as a composition of said optical confinement region.

13. A planar semiconductor optical device as claimed in claim 1, wherein said first passage has a lateral size, measured in a direction parallel to said upper major surface of said contact layer, that is substantially equal to a lateral size of said active layer.

* * * * *